(12) United States Patent
Kaminski et al.

(10) Patent No.: US 8,651,585 B2
(45) Date of Patent: *Feb. 18, 2014

(54) TOWED VEHICLE BRAKING APPARATUS

(71) Applicant: Hopkins Manufacturing Corp, Emporia, KS (US)

(72) Inventors: Gary Kaminski, Emporia, KS (US); Jonathan Gray, Garnett, KS (US); Vicki Sickler, Emporia, KS (US)

(73) Assignee: Hopkins Manufacturing Corporation, Emporia, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/870,537

(22) Filed: Apr. 25, 2013

(65) Prior Publication Data

US 2013/0233109 A1 Sep. 12, 2013

Related U.S. Application Data

(63) Continuation of application No. 11/561,196, filed on Nov. 17, 2006, now Pat. No. 8,430,458.

(60) Provisional application No. 60/739,376, filed on Nov. 23, 2005.

(51) Int. Cl.
*B60T 7/06* (2006.01)
*B60T 13/00* (2006.01)

(52) U.S. Cl.
USPC ....... 303/7; 303/3; 303/15; 303/20; 303/24.1; 303/119.3; 303/123; 188/1.11 E; 188/3 H; 188/112 R; 188/135; 188/356; 701/70; D12/180; D13/168

(58) Field of Classification Search
USPC ......... 303/7, 123, 124, 155, 9.61, 9.62, 20, 5; 701/70; 477/182; 340/901, 902
See application file for complete search history.

(56) References Cited

U.S. PATENT DOCUMENTS

| | | | |
|---|---|---|---|
| 1,907,835 A | 5/1933 | Langbein |
| 2,566,859 A | 9/1951 | Seeler |
| 2,676,225 A | 4/1954 | Jubell |
| 2,711,228 A | 6/1955 | Shank |
| 2,964,965 A | 12/1960 | Hanson |

(Continued)

FOREIGN PATENT DOCUMENTS

| | | |
|---|---|---|
| CA | 2215445 | 3/2002 |
| EP | 0064310 | 11/1982 |

OTHER PUBLICATIONS

2004 BrakePro Owner's Manual, Roadmaster, Inc., 12 pages.

(Continued)

*Primary Examiner* — Robert A Siconolfi
*Assistant Examiner* — San Aung
(74) *Attorney, Agent, or Firm* — Sheridan Ross P.C.

(57) ABSTRACT

An auxiliary braking system and method of controlling the braking a towed vehicle is provided that includes a remote control that is in selective communication with an auxiliary braking unit positioned in a towing vehicle. More specifically, it is often desirable for the operator of the towing vehicle to assess the performance of the auxiliary braking apparatus positioned in a towed vehicle. In addition, it is often advantageous for the operator to perform real time adjustments to the performance parameters of the auxiliary braking apparatus positioned in the towing vehicle without having to cease driving and physically access the auxiliary braking device.

27 Claims, 11 Drawing Sheets

(56) References Cited

U.S. PATENT DOCUMENTS

| | | | |
|---|---|---|---|
| 3,662,593 | A | 5/1972 | Pirrello et al. |
| 3,866,719 | A | 2/1975 | Steutker |
| 3,877,318 | A | 4/1975 | Castoe |
| 3,991,609 | A | 11/1976 | Asmus et al. |
| 4,186,595 | A | 2/1980 | Domitter |
| D308,525 | S | 6/1990 | Robbins |
| 5,012,689 | A | 5/1991 | Smith |
| 5,031,729 | A | 7/1991 | Wittkop et al. |
| 5,058,960 | A | 10/1991 | Eccleston et al. |
| 5,078,024 | A | 1/1992 | Cicotte et al. |
| 5,150,098 | A | 9/1992 | Rakow |
| 5,299,668 | A | 4/1994 | Youngers et al. |
| 5,333,948 | A | 8/1994 | Austin et al. |
| 5,352,028 | A | 10/1994 | Eccleston |
| 5,368,135 | A | 11/1994 | Sallee |
| 5,411,321 | A | 5/1995 | Harness |
| 5,431,253 | A * | 7/1995 | Hargrove ............... 188/3 H |
| 5,460,061 | A | 10/1995 | Redding et al. |
| D370,448 | S | 6/1996 | McCoy et al. |
| 5,579,219 | A | 11/1996 | Mori et al. |
| 5,637,797 | A | 6/1997 | Zumberge et al. |
| 5,782,542 | A | 7/1998 | McGrath |
| 5,854,517 | A | 12/1998 | Hines |
| 5,911,483 | A | 6/1999 | Overhulser |
| 5,915,797 | A | 6/1999 | Springer |
| 5,915,798 | A | 6/1999 | Ford |
| 5,920,128 | A | 7/1999 | Hines |
| 5,954,164 | A | 9/1999 | Latham |
| D418,098 | S | 12/1999 | Wallace |
| 5,999,091 | A | 12/1999 | Wortham |
| 6,050,649 | A | 4/2000 | Hensley |
| 6,095,619 | A | 8/2000 | Granata |
| 6,126,246 | A * | 10/2000 | Decker et al. ............... 303/7 |
| 6,131,712 | A | 10/2000 | Rhodenizer |
| 6,158,823 | A | 12/2000 | Shuck |
| 6,222,443 | B1 | 4/2001 | Beeson et al. |
| 6,280,004 | B1 | 8/2001 | Greaves, Jr. |
| 6,501,376 | B2 | 12/2002 | Dieckmann et al. |
| D468,243 | S | 1/2003 | Iida |
| D477,553 | S | 7/2003 | Brock et al. |
| 6,608,554 | B2 | 8/2003 | Lesesky et al. |
| 6,609,766 | B1 | 8/2003 | Chesnut |
| 6,615,125 | B2 | 9/2003 | Eccleston et al. |
| 6,626,504 | B2 | 9/2003 | Harner et al. |
| 6,634,466 | B1 | 10/2003 | Brock et al. |
| 6,644,761 | B2 | 11/2003 | Schuck |
| 6,652,042 | B2 | 11/2003 | Johnson |
| D490,349 | S | 5/2004 | Brock et al. |
| D498,190 | S | 11/2004 | Brock et al. |
| 6,837,551 | B2 | 1/2005 | Robinson et al. |
| 6,845,851 | B1 | 1/2005 | Donaldson et al. |
| 6,895,311 | B2 | 5/2005 | Grimm |
| 6,918,466 | B1 | 7/2005 | Decker, Jr. et al. |
| 6,959,793 | B2 * | 11/2005 | Cinquemani ............ 188/112 R |
| 6,966,613 | B2 | 11/2005 | Davis |
| 8,430,458 | B2 | 4/2013 | Kaminski et al. |
| 2002/0030405 | A1 * | 3/2002 | Harner et al. ............ 303/123 |
| 2004/0007913 | A1 | 1/2004 | Erwin |
| 2004/0160117 | A1 * | 8/2004 | Brock et al. ............ 303/20 |
| 2005/0093366 | A1 | 5/2005 | Elstad et al. |
| 2005/0146212 | A1 | 7/2005 | Cannon |
| 2005/0225169 | A1 | 10/2005 | Skinner et al. |
| 2006/0071549 | A1 * | 4/2006 | Chesnut et al. ............ 303/123 |

OTHER PUBLICATIONS

Activator Brake Control description as found on Jun. 16, 2000, www.hitchcorner.com, 1 page.
Blue Ox Apollo Braking System, www.bludox.com, US/Brakes/apollo.htm, Nov. 2005, 3 pages.
Brake Buddy Vantage Installation Manual, 2004, 5 pages.
Brake Buddy Vantage, Break-away Installation Manual, 2004, 2 pages.
Brake Controllers Article, circa Oct. 10, 1999, reprinted from www.rversonline.org, 1 page.
BrakePro Braking System, www.roadmaster-tow-bars.com/Brakepro.htm, printed on May 19, 2004 (product believed to be added to the website after Jun. 23, 2003), 4 pages.
BX 88179 Installation Instructions, Blue Ox, Apollo Brake System, 2003, 4 pages.
D-Celerator, Unified Tow Brake Manual, Aug. 2005, www.usgear.com, 11 pages.
Digital photographs of a Roadmaster BrakePro braking system unit with fastening device, purchased on Jan. 29, 2004, 5 pages.
Installation Instructions for the Second Vehicle Kit # 98100 for Brake Master 9000 & 9100, copyright 1999, from http://www.roadmasterinc.com/pdf/85-1850.pdf, printed Jun. 25, 2004, 11 pages.
New Even Brake Portable Proportional Braking System, Road Master, Inc. Website, www.roadmasterinc.com /evenbrake.html, Nov. 2005, 3 pages.
Tekonsha Prodigy Product, circa 2002, but date uncertain, www.tekonsha.com, 3 pages.
3 Digital Photographs of Tekonsha Prodigy Brake Control unit purchased prior to Nov. 15, 2002.
U.S. Gear Corp. Website, www.usgear.com, D-Celerator Unified Tow Brake product, 5 pages.
Unified Tow Brake Brochure, circa 2001, printed from www.usgear.com, 6 pages.
K. Stephen Busick, "Supplemental Braking Systems," Jul. 2001 issue of Family Motor Coaching magazine, pp. 60-75.
Master concepts Inc. Brakebuddy® brochure dated Jan. 2002, 6 pages.
Master concepts Inc. Brakebuddy® brochure dated Aug. 2001, 6 pages.
Master concepts Inc. Brakebuddy® brochure dated Jun. 2003, 6 pages.
Photos taken of Blue Ox Apollo Braking System with brake pedal fastener, purchased approximately Mar. 2003, 12 pages.
Tekonsha Primus Electric Brake Controller—Proportional, www.etrailer.com, 4 pages.
Valley Odyssey Electric Trailer Brake Controller—Proportional, www.etrailer.com, 4 pages.
Official Action for Canadian Patent Application No. 2,568,538 dated Mar. 15, 2013 2 pages.
Official Action for U.S. Appl. No. 11/561,196, mailed Feb. 3, 2010 13 pages.
Official Action for U.S. Appl. No. 11/561,196, mailed Sep. 30, 2010 15 pages.
Official Action for U.S. Appl. No. 11/561,196, mailed Mar. 18, 2011 15 pages.
Official Action for U.S. Appl. No. 11/561,196, mailed Sep. 7, 2011 17 pages.
Official Action for U.S. Appl. No. 11/561,196, mailed Jan. 4, 2012 18 pages.
Official Action for U.S. Appl. No. 11/561,196, mailed Jul. 18, 2012 17 pages.
Notice of Allowance for U.S. Appl. No. 11/561,196, mailed Mar. 12, 2013 8 pages.

* cited by examiner

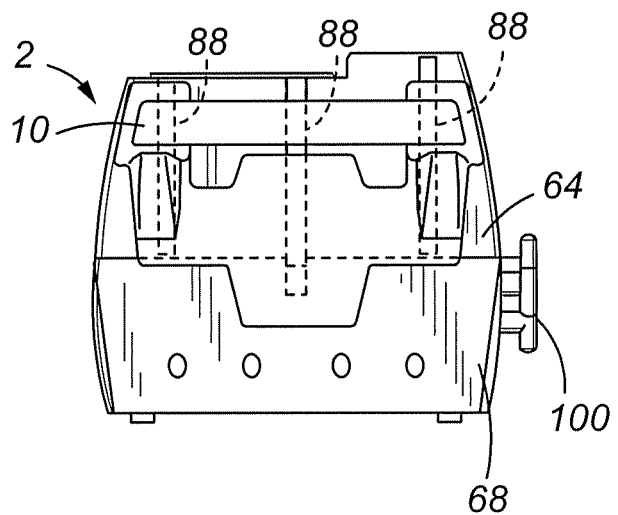
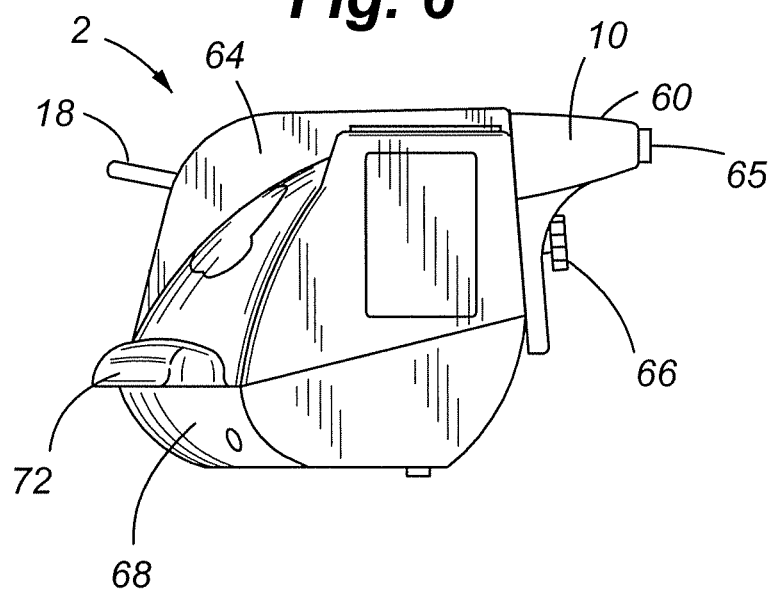

ns Ser. No. 10/015,339, now U.S. Pat. No. 6,634,466, filed Dec. 12, 2001; U.S. patent application Ser. No. 10/295,967, now abandoned, filed Nov. 15, 2002; U.S. patent application Ser. No. 10/650,347, now U.S. Pat. No. 6,918,466, filed Aug. 27, 2003; U.S. patent application Ser. No. 29/185,671, now U.S. Pat. No. D498,190, filed Jun. 30, 2003; U.S. patent application Ser. No. 29/166,507, now U.S. Pat. No. D477,553, filed Aug. 27, 2002; U.S. patent application Ser. No. 10/739,491, now abandoned, filed Dec. 17, 2003; and U.S. patent application Ser. No. 29/243,369, filed Nov. 23, 2005, all of which are incorporated by reference in their entireties herein.

TOWED VEHICLE BRAKING APPARATUS

CROSS REFERENCE TO RELATED APPLICATIONS

This application is a Continuation of U.S. patent application Ser. No. 11/561,196, filed Nov. 17, 2006, which claims the benefit of U.S. Provisional Patent Application Ser. No. 60/739,376, filed Nov. 23, 2005, the entirety of each is incorporated by reference herein. This application is also related to U.S. patent application Ser. No. 10/015,339, now U.S. Pat. No. 6,634,466, filed Dec. 12, 2001; U.S. patent application Ser. No. 10/295,967, now abandoned, filed Nov. 15, 2002; U.S. patent application Ser. No. 10/650,347, now U.S. Pat. No. 6,918,466, filed Aug. 27, 2003; U.S. patent application Ser. No. 29/185,671, now U.S. Pat. No. D498,190, filed Jun. 30, 2003; U.S. patent application Ser. No. 29/166,507, now U.S. Pat. No. D477,553, filed Aug. 27, 2002; U.S. patent application Ser. No. 10/739,491, now abandoned, filed Dec. 17, 2003; and U.S. patent application Ser. No. 29/243,369, filed Nov. 23, 2005, all of which are incorporated by reference in their entireties herein.

The following references that are related to Global Positioning Systems are incorporated by reference in their entirely: U.S. Pat. No. 6,833,811 to Zeitfuss et al., issued Dec. 21, 2004; U.S. Pat. No. 6,789,012 to Childs et al., issued Sep. 7, 2004; U.S. Pat. No. 6,526,351, issued Feb. 25, 2003; U.S. Pat. No. 6,321,158 to DeLorme et al., issued Nov. 20, 2001; U.S. Pat. No. 6,980,813 to Mohi et al., issued Dec. 27, 2005; U.S. Patent Publication No. 2001/0032236, published Oct. 18, 2001; U.S. Pat. No. 6,799,047, issued Sep. 28, 2004; U.S. Pat. No. 7,020,475, issued Mar. 28, 2006; U.S. Pat. No. 6,839,560, issued Jan. 4, 2005; U.S. Pat. No. 6,665,611, issued Dec. 16, 2003; U.S. Pat. No. 6,900,762, issued May 31, 2005; U.S. Pat. No. 5,917,425, issued Jun. 29, 1999; U.S. Pat. No. 6,201,497, issued Mar. 13, 2001; U.S. Pat. No. 6,909,367, issued Jun. 21, 2005; U.S. Pat. No. 6,965,344, issued Nov. 15, 2005; U.S. Patent Publication No. 2005/0105496, published May 19, 2005; U.S. Pat. No. 6,477,526, issued Nov. 5, 2002; U.S. Pat. No. 6,317,684, issued Nov. 13, 2001; U.S. Pat. No. 6,952,181, issued Oct. 4, 2005; U.S. Pat. No. 6,249,252, issued Jun. 19, 2001; U.S. Pat. No. 6,236,365, issued May 22, 2001; U.S. Patent Publication No. 2005/0202831, published Sep. 15, 2005; U.S. Pat. No. 6,029,069, issued Feb. 22, 2000; U.S. Pat. No. 6,898,559, issued May 24, 2005; U.S. Patent Publication No. 2002/0089434, published Jul. 11, 2002; U.S. Pat. No. 5,588,038, issued Dec. 24, 1996; and U.S. Pat. No. 6,768,963, issued Jul. 27, 2004.

FIELD OF THE INVENTION

The present invention relates to a braking apparatus, and more particularly to an improved, stand alone, auxiliary braking apparatus for towed vehicles.

BACKGROUND OF THE INVENTION

When traveling by motor home (hereinafter "towing vehicle"), it is often desirable to tow another vehicle. The towed vehicle is essentially dead weight that pushes the towing vehicle when the operator tries to slow or stop, which can limit the life span, cause decreased performance or cause failure of the towing vehicle's brakes. One way to solve this problem is to brake the towed vehicle in conjunction with the towing vehicle so that its brakes do not have to compensate for the additional momentum of the towed vehicle. Thus the overall load felt by the towed vehicle's brakes is reduced and their life span is increased.

Various methods of braking the towed vehicle in conjunction with the towing vehicle are known in the art. For example, self-contained auxiliary or supplemental braking apparatus are common and require no permanent installation in the towed vehicle. Rather, such auxiliary braking apparatus are positioned on the floorboard of the towed vehicle and employ an actuator arm, such as a pneumatic or hydraulic cylinder/piston arm, electric screw, etc. to selectively depress the brake pedal of the towed vehicle.

Some auxiliary braking apparatus use an RF signal to provide information to the operator of the motor home. For example, information related to the braking or towing status of the towed vehicle is often transmitted to an operator of the towing vehicle from the auxiliary braking apparatus to a remote unit located in the towing vehicle. While this information may be useful, the operator remains uninformed about equally important issues, such as whether the supplemental braking system is functioning efficiently within desired parameters. Thus there is a need for an auxiliary brake apparatus that transmits diagnostic information related to the auxiliary braking apparatus and the towed vehicle to the operator of the towing vehicle.

One drawback of auxiliary braking systems of the art is that none allow the operator to control particular braking parameters. As such, once the operator has designated brake settings on the auxiliary braking apparatus, the towing vehicle must be stopped so that the operator can make adjustments to the auxiliary braking apparatus. Thus there is a need for a system that allows the operator of the towing vehicle to remotely adjust certain parameters of the auxiliary braking apparatus, such as braking pressure, braking sensitivity, etc. from the towing vehicle.

Since the auxiliary brake apparatus is not located in the towing vehicle and typically the towed vehicle is unoccupied while in transit, the operator is generally unaware of whether the auxiliary braking apparatus has fully released the brake of the towed vehicle when supplemental braking is not required. If the brake pedal is not fully retracted during non-use, excess strain is put on the towing vehicle as well as needless wear and tear on the brakes of the towed vehicle. Similarly, operators of the towing vehicle are also generally unaware as to whether such units are working efficiently and/or are about to fail. Thus there is a need for an auxiliary brake system that while in transit, monitors and reports on the efficiency of integral components and indicates whether the brake pedal of the towed vehicle has been fully disengaged during periods of non-use.

Typical RF remote units used in the towing vehicles are powered through a cord interconnected to the towing vehicle's cigarette lighter or other power source. Many problems are associated with this corded configuration however. For example, the operator can become inadvertently entangled in the cord, the cord typically prevents the unit from being placed in the operator's line of sight, and electrical interference with the towing vehicle's electrical system can occur. Thus there is a need for an auxiliary braking system that employs a remote control unit that is powered independently of the towing vehicle's electrical system.

Another drawback is that auxiliary brake systems of the art are often susceptible to operator error. Typically, the auxiliary braking apparatus employs an air reservoir that is fed by an air compressor. Inevitably, the air reservoir remains somewhat pressurized once the unit is disconnected from the power source that feeds the compressor. While the lack of electrical power will generally prevent accidental discharge of the unit, once power is restored to the unit for example, when the device is plugged into a cigarette lighter of the towed vehicle, there is a risk that the unit could immediately activate. Currently known systems attempt to remedy this issue by providing a manually operated bleed valve that allows the operator to alleviate the air pressure when the device is disconnected. There is no way, however, to ensure that the operator will remember to perform this depressurizing step. Thus there is a need for a safer auxiliary braking system that automatically bleeds any residual air from the auxiliary braking apparatus at system shutdown in order to prevent accidental discharge when the apparatus is subsequently powered up.

Another problem inherent to many auxiliary braking systems is that they are designed to be used with a "dead" brake pedal in the towed vehicle. As such, the vacuum associated with the power brakes of many towed vehicles must be relieved before the unit can be effectively used. If the vacuum is not relieved and the auxiliary braking system is activated, excessive braking of the towed vehicle can occur that can damage the towed vehicle. Known systems attempt to address this issue by requiring the user to remember to activate the auxiliary braking apparatus several times to exhaust the vacuum reservoir of the towed vehicle. Thus there is a need for a system that not only reminds the user of this necessary procedure, but also automatically depresses the towed vehicle's brake pedal a number of times to deplete the towed vehicle's vacuum reservoir.

Even if an operator remembers to initially release the vacuum brake reservoir pressure, he or she often later forgets to perform this necessary operation once the auxiliary braking unit has been installed. That is, since many auxiliary brake systems are powered through the cigarette lighter or 12V power source of the towed vehicle, the operator must run the towed vehicle's engine periodically in order to keep the battery adequately charged. Restarting the towed vehicle's engine to recharge the vehicle's battery also recharges the towed vehicle's vacuum reservoir. If not relieved, excessive, unwanted braking could occur in the towed vehicle. Thus, there is a need for a self-contained, auxiliary braking apparatus that informs an operator of the subsequent recharging of the towed vehicle's vacuum reservoir.

Known supplemental brake systems are known as either "proportional" or "on/off" braking systems. Generally, "on/off" (which as used herein is also meant to include "discrete level" systems) systems apply the brakes of the towed vehicle at a preset level when the unit determines that braking is required. Proportional braking systems vary the braking pressure in proportion to the amount of braking occurring in the towing vehicle. There are situations, for example, city versus highway driving, in which drivers prefer to use one braking method over the other. For example, an on/off system will generally not apply towed vehicle braking when the towing vehicle is traveling at low speeds. Thus using a proportional system may be more preferable for city driving conditions wherein slower speeds are typical. To date, however, consumers are required to make a choice between buying an on/off or a proportional system. Thus there is a need for an auxiliary braking apparatus that allows an operator to quickly and easily transition between on/off and proportional braking modes.

Most states require towed items over a certain weight to be equipped with a secondary safety device generally referred to as a "breakaway" system, which is used to brake the towed vehicle, if it separates from the towing vehicle. Auxiliary braking systems of the art meet this requirement by using a breakaway switch. Many operators, however, either forget to install this switch or ignore state mandate. Thus in order to improve consumer safety and compliance with state law, there is a need for a system that detects the absence of a breakaway system and alerts the operator that the breakaway system is absent or malfunctioning.

Another problem inherent to auxiliary brake systems relates to their ability to react and apply the towed vehicle's brakes as quickly as possible. Most vehicle braking systems require at least some inward travel of the brake pedal before actual braking pressure occurs. Conventional auxiliary braking apparatus do not take this non-braking stage into account when applying braking pressure and are thus not as effective as they could be. Thus there is a need for an auxiliary braking unit that applies cylinder/piston extension in such a way to quickly surpass the non-braking stage of travel of the towed vehicle's brake pedal and then reverts to a slower, more suitable braking force for the particular braking application.

The embodiments of the present invention described below represent, among other things, an improvement over known auxiliary braking systems and is designed to overcome the aforementioned problems and other needs.

SUMMARY OF THE INVENTION

It is one aspect of the present invention to provide an auxiliary braking system that transmits diagnostic information relating to the performance of the auxiliary braking apparatus via an RF signal to the towing vehicle. In one embodiment of the present invention, the auxiliary braking system monitors and transmits information related to, but not limited to, whether supplemental braking is occurring, the battery level of the towed vehicle, the operational status of the braking apparatus, compressor efficiency, whether the towed vehicle's brake pedal has been fully released, and/or whether the towed vehicle's brake vacuum reservoir has been bled. In one embodiment, such information is conveyed via a transmitter to a receiver located in the towing vehicle and may be displayed visually or audibly. The system may also store selected operational information that may later be recovered for purposes of performance or failure analysis.

It is another aspect of the present invention to provide an auxiliary braking system that allows for real time, remote adjustment of various braking parameters while in transit, thereby alleviating the need for the operator to manually adjust settings of the system. In one embodiment of the invention, such parameters include, among other things, the sensitivity of the response of an inertia sensing device included in the auxiliary braking device that is used to activate the unit and define the amount of braking pressure. A remote control in the towing vehicle may be employed to transmit an RF signal relating to the desired parameter to the auxiliary braking apparatus.

It is yet another aspect of the present invention to monitor the piston arm that depresses the towed vehicle's brake pedal. In one embodiment, the present invention uses an electronic regulator to monitor the pressure of the extend side of the piston arm, which is compared to a predetermined value to determine if the piston arm has been fully retracted. Alternatively, the pressures on both the extend side and the retract side of the piston arm may be compared to determine the location of the piston arm. In one embodiment, such information is transmitted by a transmitter or a transceiver to a receiver or transceiver in the remote unit where it is displayed or otherwise made apparent to the operator.

It is still yet another aspect of the present invention to provide a remote control that communicates with the auxiliary braking system that may be autonomously powered in order to eliminate problems commonly associated with corded remotes. In one embodiment, a battery powered remote is employed thereby eliminating any electrical interference with the towing vehicle's electrical system and freeing the towing vehicle's electrical port to be used for other desired electrical devices, such as cellular phones, GPS units, lighters, satellite radios, etc. In one embodiment, the remote device and/or the auxiliary brake apparatus powers down during periods of inactivity in order to extend battery life.

It is another aspect of the present invention to provide a safer, self-contained, auxiliary braking apparatus that automatically relieves any residual pressure in the apparatus' reservoir. In one embodiment of the invention, the auxiliary braking apparatus has an electrically operated bleed valve that opens when the auxiliary braking apparatus is turned off. When the apparatus is subsequently turned on, the electrically operated valve is closed, thereby allowing for pressure to once again build up in the reservoir.

It is yet another aspect of the present invention to provide a reminder to the operator to disable the brake power assist feature of the towed vehicle to ensure that excessive, unwanted braking does not occur. One embodiment of the present invention provides an automatic brake bleed indicator, which may be located either on the apparatus or associated with the remote control, that reminds an operator to bleed the towed vehicle's brakes upon start up of the auxiliary braking apparatus. An activator may be further provided that causes the apparatus to cycle the towed vehicle's brake pedal a pre-selected number of times to release the pressure in the towed vehicle's brake vacuum reservoir so that the operator no longer needs to remember the number of cycles suggested by the manufacturer.

It is still yet another aspect of the present invention to provide the ability to remind the operator to reset the automatic brake bleed feature in the event that the towed vehicle's engine has been started. In one embodiment, the auxiliary braking apparatus monitors the towed vehicle's electrical system voltage and compares the monitored voltage to standardized values to determine whether the towed vehicle's engine has been started. If so, an indicator is activated on the auxiliary apparatus and/or an operator's remote control to remind the operator to activate the apparatus' automatic bleed feature.

It is another aspect of the present invention to provide an auxiliary braking apparatus that allows the operator to switch between "on/off" and "proportional" braking, thereby reducing cost and adding flexibility for the operator. In one embodiment of the present invention, the operator manually selects the desired method of braking via the remote control unit located in the towing vehicle or may manually depress an activator on the apparatus.

It is another aspect of the present invention to provide a safer auxiliary braking apparatus that detects the absence of a "breakaway" system. A switch is provided by embodiments of the present invention that is associated with the breakaway device. When the towed vehicle is separated from the towing vehicle, the auxiliary braking apparatus will engage the brake pedal thereby stopping the towed vehicle. Absence of the breakaway device may be transmitted via an RF signal to a display device in the towing vehicle.

It is yet another aspect of the present invention to provide an auxiliary braking apparatus that more effectively actuates the towed vehicle's brakes by varying the brake pedal depression speed. In one embodiment, increased pressure is initially applied for a short, specified time thereby allowing the brake pedal to travel a predetermined distance. The desired brake pressure is then applied to further depress the brake pedal.

It is still yet another aspect of the present invention to provide an auxiliary braking apparatus that allows for the monitoring of the apparatus' compressor run time to identify possible unit inefficiencies and to anticipate failure. For example, unless there is an appreciable audible hiss, pneumatic pressure leaks are undetectable. Some leakage can be tolerated because to fashion a leak-proof system would be cost prohibitive. The drawback of leakage is that the compressor of the apparatus must continually run to replenish the amount of fluid or gas in the reservoir, which is associated with wear on the compressor and/or excessive drain on the vehicle's battery. In one embodiment of the present invention, the run time of the compressor is monitored and compared with a preset, ideal run time. Generally, if the monitored runtime is greater than the preset value, the operator of the towed vehicle is notified either by an indicator on the apparatus or the remote control unit. Identification of longer than expected compressor run times allows the operator to investigate whether leaks and/or other mechanical failures have occurred in the system, thereby circumventing the potentially catastrophic situation wherein the compressor fails and the towed vehicle's brakes are not applied.

The Summary of the Invention is neither intended nor should it be construed as being representative of the full extent and scope of the present invention. The present invention is set forth in various levels of detail in the Summary of the Invention as well as in the attached drawings and the Detailed Description of the Invention and no limitation as to the scope of the present invention is intended by either the inclusion or non-inclusion of elements, components, etc. in this Summary of the Invention. Additional aspects of the present invention will become more readily apparent from the Detail Description, particularly when taken together with the drawings.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these inventions.

FIG. 5 is a rear view of the embodiment of the present invention shown in FIG. 1;

FIG. 6 is a right elevation view of the embodiment of the present invention shown in FIG. 1;

Figure 1:
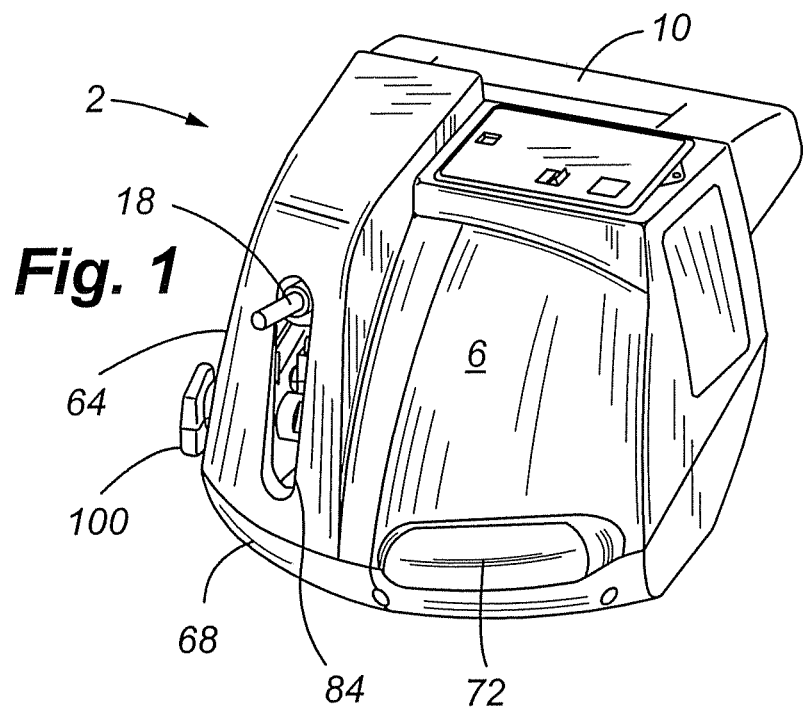
FIG. 1 is a perspective view of one embodiment of the present invention.
Figure 2:
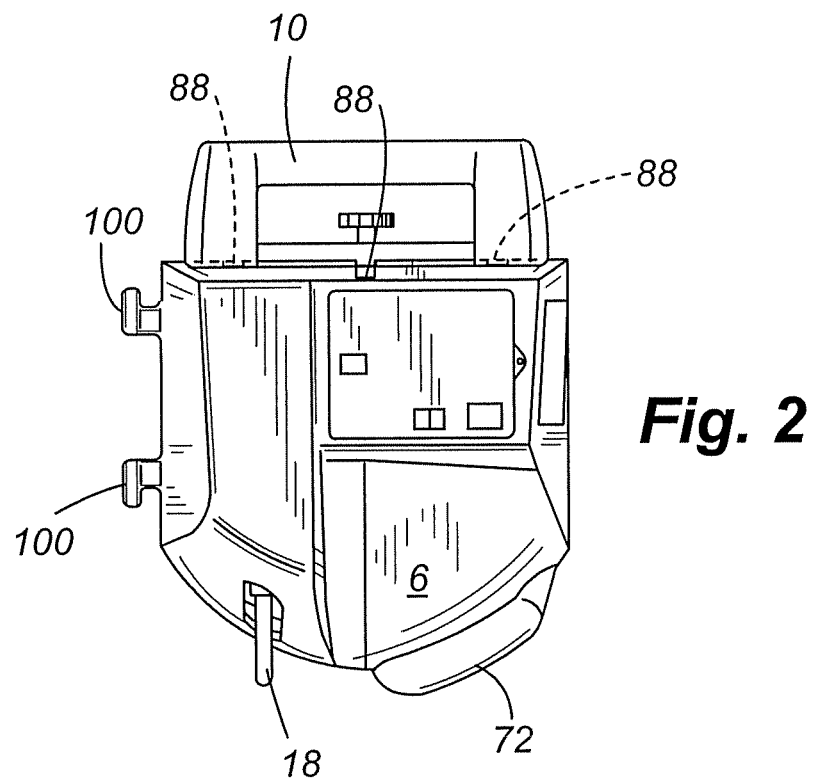
FIG. 2 is a top plan view of the embodiment of the present invention shown in FIG. 1.
Figure 3:
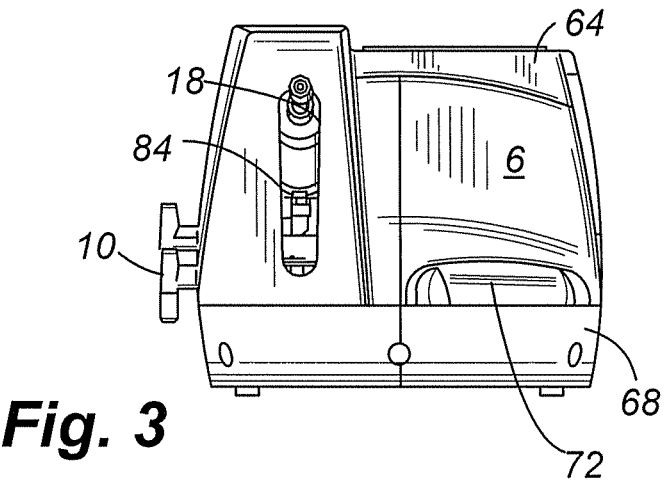
FIG. 3 is a front elevation view of the embodiment of the present invention shown in FIG. 1.
Figure 4:
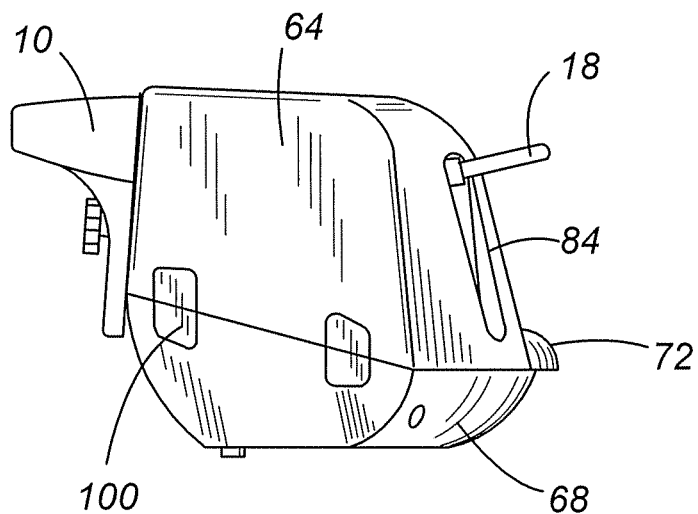
FIG. 4 is a left elevation view of the embodiment of the present invention shown in FIG. 1.

To assist in the understanding of the present invention the following list of components and associated numbering found in the drawings is provided herein:

| # | Component |
|---|---|
| 2 | Auxiliary braking apparatus |
| 6 | Housing |
| 10 | Stand-off member |
| 14 | Cylinder |
| 18 | Actuator arm |
| 22 | Brake pedal |
| 26 | Towed vehicle |
| 30 | Gripping member |
| 34 | Compressor |
| 38 | Reservoir |
| 42 | Solid state inertia device |
| 46 | Circuit board |
| 50 | Valve |
| 54 | Gauge |
| 58 | Regulator |
| 62 | Drain valve |
| 64 | Upper shell |
| 68 | Lower shell |
| 72 | Handle |
| 76 | Dashboard |
| 80 | Floorboard |
| 84 | Actuator arm aperture |
| 88 | Channel |
| 92 | Seat |
| 96 | Control panel |
| 100 | Cleat |
| 104 | Power cord |
| 106 | User interface |
| 108 | Casing |
| 112 | Corded plug |
| 116 | 12 volt lighter receptacle |
| 118 | Brake bleed indicator |
| 120 | Remote control |
| 122 | Compressor runtime indicator |
| 124 | Extend side of cylinder |
| 128 | Retract side of cylinder |
| 130 | Sensitivity control member |
| 132 | Transmitter/receiver/transceiver |
| 136 | Sensitivity indicator |
| 140 | Piping |
| 148 | Braking Indicator |
| 150 | Inspection indicator |
| 154 | Low battery indicator |
| 158 | All Normal Indicator |
| 160 | Breakaway mechanism |
| 164 | Lanyard |
| 168 | Breakaway display |
| 170 | Arm Extension Indicator |
| 174 | Air pressure adjustment button |
| 178 | Start button |
| 182 | Test button |
| 184 | Air pressure display |

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

Various illustrative embodiments of the present invention will now be discussed. It is envisioned that the improvements described herein can be tailored to many different types of auxiliary braking systems (e.g., pneumatic, hydraulic, etc.). Thus, the following descriptions of embodiments of the present invention are meant to clarify how the improvements described herein could be employed in a conventional system and as such, any discussion of the type of the individual components of an auxiliary braking system are not intended to limit the scope of the present invention in any manner.

FIGS. 1-14 depict various perspective and elevation views of one embodiment of the auxiliary braking apparatus 2. In general, the auxiliary braking apparatus 2 is comprised of a housing 6 interconnected to a stand-off member 10. As shown in FIG. 10, a basic schematic representation of one embodiment of the present invention, the housing 6 encases a cylinder 14 with an actuator arm 18 that communicates with and ultimately depresses a brake pedal 22 of the towed vehicle 26 via a selectively positionable gripping member 30. A compressor 34 maintains a controlled pressure on the fluid within a reservoir 38. A solid-state inertia device 42 may be employed to sense changes in inertia attributable to the braking of the towing vehicle and communicate such changes to a circuit board 46 that controls the position of the actuator arm 18. The circuit board 46 communicates with a valve 50, that controls fluid flow between the reservoir 38 and the cylinder 14. A gauge 54 may be connected to the housing 6 to display the amount of fluid pressure available in the reservoir 38 and/or the pressure that will be applied to extend the actuator arm 18. It is envisioned that the operator is also able to manually adjust the amount of fluid pressure throughout the system, thereby affecting the amount of braking pressure applied. For example, embodiments provide a regulator 58 that allows the operator to manually adjust the amount of fluid pressure that travels from the reservoir 38 to the cylinder 14. In addition, a drain valve 62 seated on the housing 6, is connected in parallel with the reservoir 38 to manually adjust the amount of fluid pressure desired for operating the auxiliary braking apparatus 2. As described below, or as is otherwise within the skill of those in the art, additional displays, ports, valves, buttons, gauges, or other indicator elements can be used alone or in combination with the components previously described and still be within the spirit and scope of the present invention.

Referring now to FIGS. 1-6, the housing 2 may be comprised of an upper shell 64 and a lower shell 68. This two-piece construction facilitates assembly and servicing of the auxiliary braking apparatus 2. The housing 2, however, can also be made of a one-piece construction if so desired. The upper shell 64 and lower shell 68 can be made in a variety of shapes and materials, all of which are also within the spirit and scope of the present invention. In one embodiment, the upper shell 64 is made out of an impact-resistant, lightweight material, such as Acrylonitrile Butadiene Styrene ("ABS") plastic or a material having similar characteristics, in order to prolong the life of the auxiliary braking apparatus 2 by minimizing any unexpected impact from, for example, accidental dropping or bumping of the apparatus 2 during installation and removal. In addition, using a material like ABS reduces the overall weight of the auxiliary braking apparatus 2, thereby facilitating the removal and installation of the auxiliary braking apparatus 2, which is especially desirable for elderly operators. In one embodiment, the housing encases all of the necessary components to monitor, control and actuate the auxiliary braking apparatus, thereby making the present invention highly portable. Various types of handles 72 may also be interconnected to the housing in order to facilitate portability and promote ergonomic handling of the unit.

In one embodiment, the upper shell 64 is configured with a forward sloping profile so that the auxiliary braking apparatus 2 can be positioned against the brake pedals 22 of a variety of towed vehicles 26 without the concern that the auxiliary braking apparatus 2 will be obstructed by dashboards 76 or vehicle components emanating therefrom. Thus, the sloping profile of the upper shell 64 offers an advantage over other known auxiliary braking apparatus, which are more box-like in design, and hence, more limited to only those vehicles with sufficient clearance between their respective floorboard 80 and dashboards 76. In one embodiment, the upper shell 64 is further comprised of a plurality of apertures that are used to position various gauges, plugs, buttons, and knobs, as further discussed below. Alternatively, the upper shell 64 can house a control panel 96 of various visual (e.g. digital and/or analog indicators) and/or audio indication means. In addition, the upper shell 64 includes an actuator arm aperture 84 that allows the actuator arm 18 to be moved up or down to accommodate varying heights of brake pedals 22, and at least one channel 88 that is vertically positioned on a rear side of the upper shell 64 that allows the stand-off member 10 to be adjusted to abut against a variety of sizes of driver's seats 92. In one embodiment, the upper shell 64 is further comprised of two upper profiles of cleats 100 that are interconnected to or molded as part of the upper shell 64. Similarly, lower profiles of cleats 100 are molded or interconnected at corresponding positions along the lower shell 68 so that when the upper shell 64 and lower shell 68 are interconnected, L-shaped cleats 100 are formed that can be used to wrap a power cord 104 during non-use of the auxiliary braking apparatus 2. As one ordinarily skilled in the art can appreciate, any number of cleats 100 can interconnected or integrated into the housing 6 or none need be used at all. Moreover, the cleats 100 can be made in a variety of shapes and sizes.

In one embodiment, the lower shell 68 acts as a base for the auxiliary braking apparatus 2. In addition, the lower shell 68 aids in encasing the reservoir 38 and compressor 34. Similar to the upper shell 42, in one embodiment, the lower shell 44 has a upward sloping profile in order to avoid any protrusions emanating from the floorboard 4 of the towed vehicle and thus, making the auxiliary braking apparatus 2 universally adaptable to various makes and models of towed vehicles.

Figure 7:
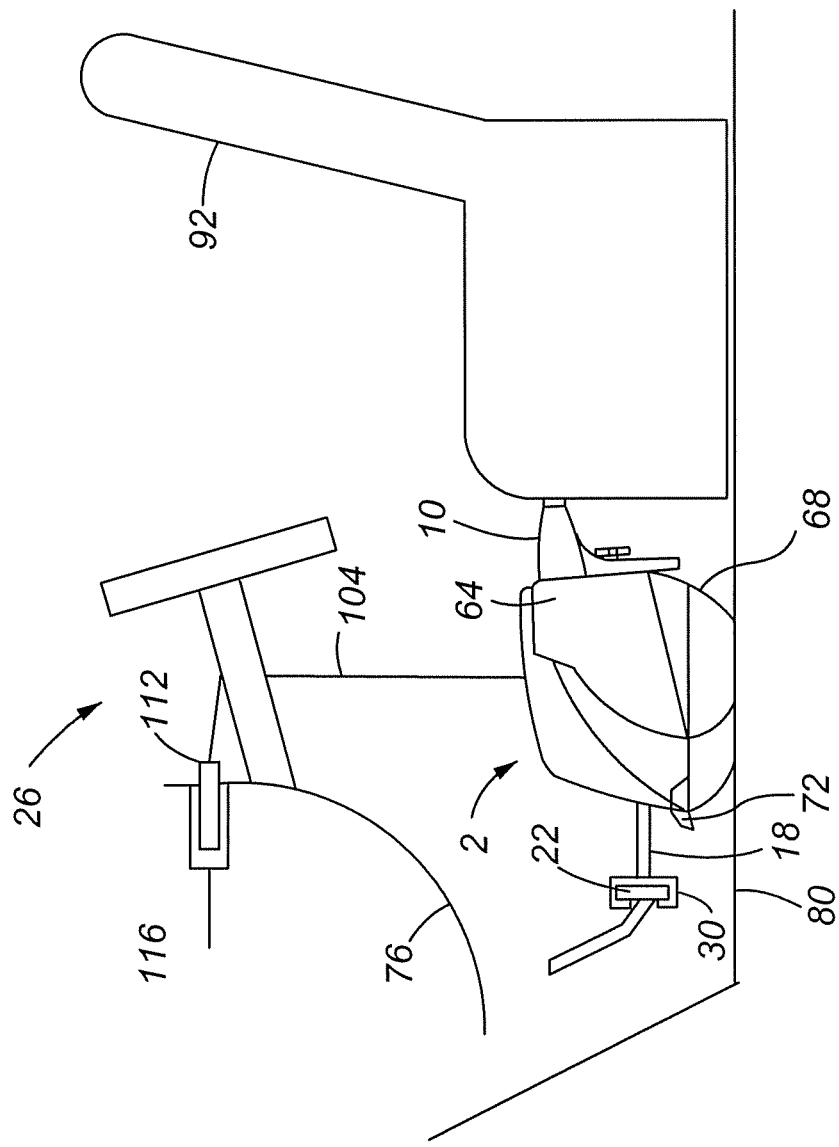
FIG. 7 is a right elevation view of a breakaway apparatus positioned in a towed vehicle.
Figure 8:
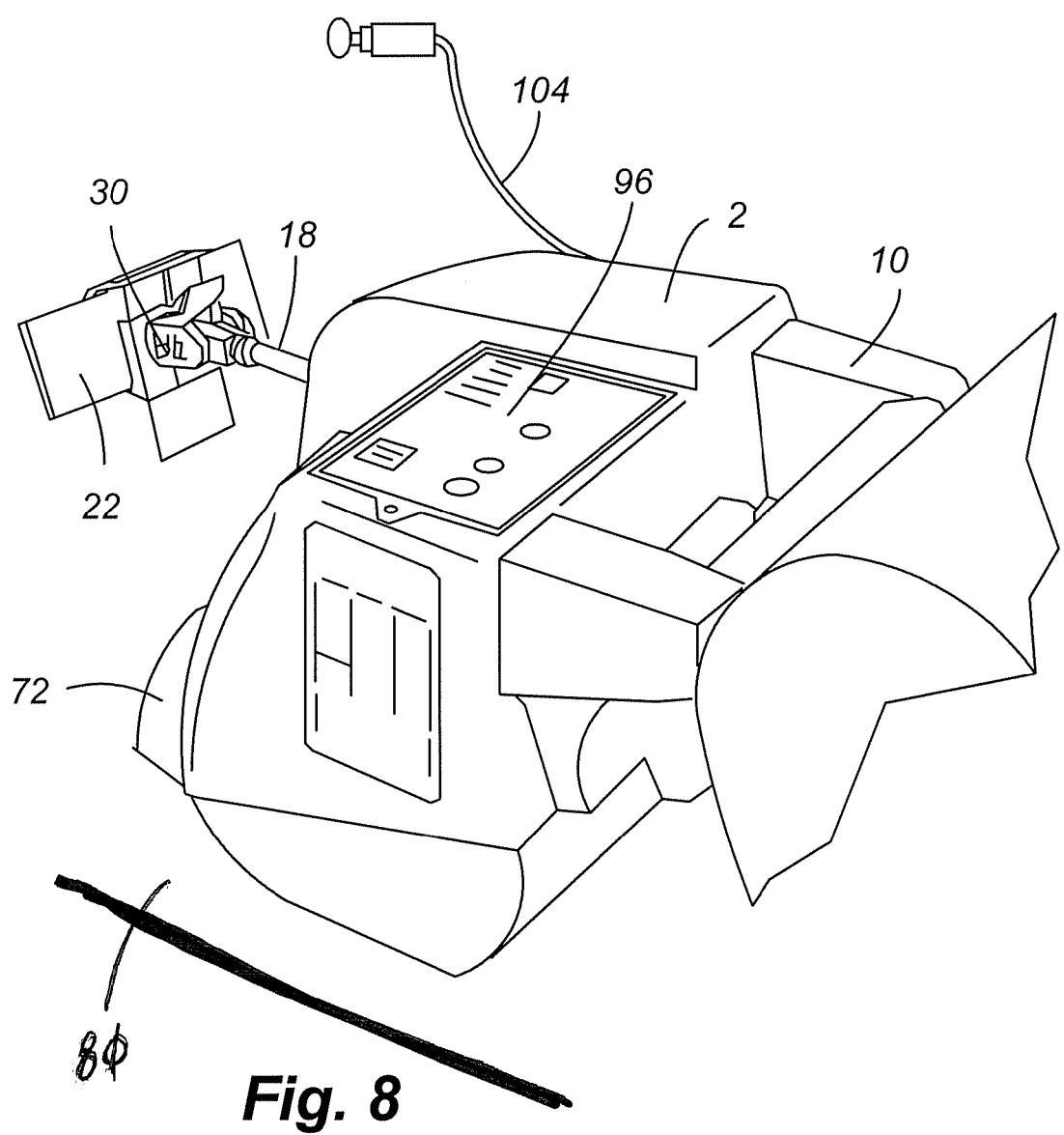
FIG. 8 is a perspective view of one embodiment of the present invention positioned in an automobile.

Referring now to FIGS. 7 and 8, in order to securely position the auxiliary braking apparatus 2 on the floorboard 80, embodiments of the present invention include the stand-off member 10 that can also be used as a handle. In one embodiment, a combined handle/stand-off 10 is used, thereby satisfying the need for a carrying handle with a means for securely positioning the auxiliary braking apparatus. In this configuration, less manufacturing materials are used and the overall weight of the unit is minimized, which facilitates installation and removal.

Figure 9:
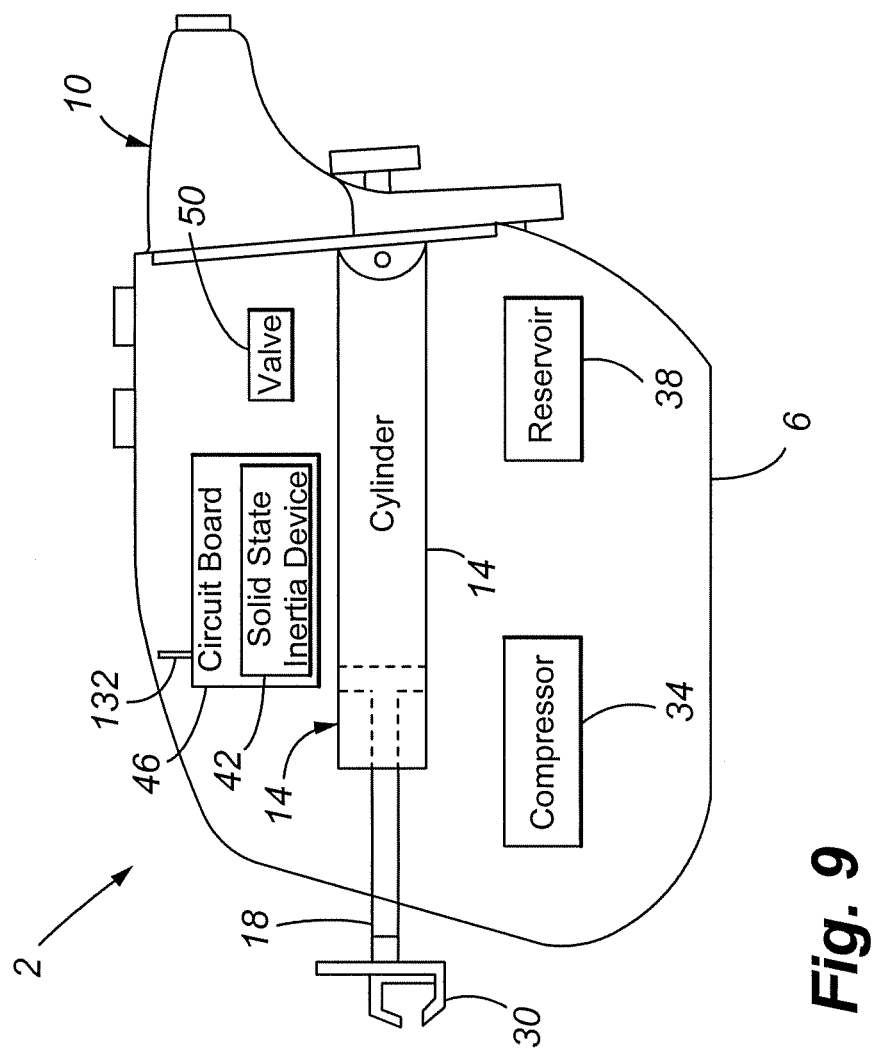
FIG. 9 is a right elevation view of one embodiment of the present invention showing the internal components.
Figure 10:
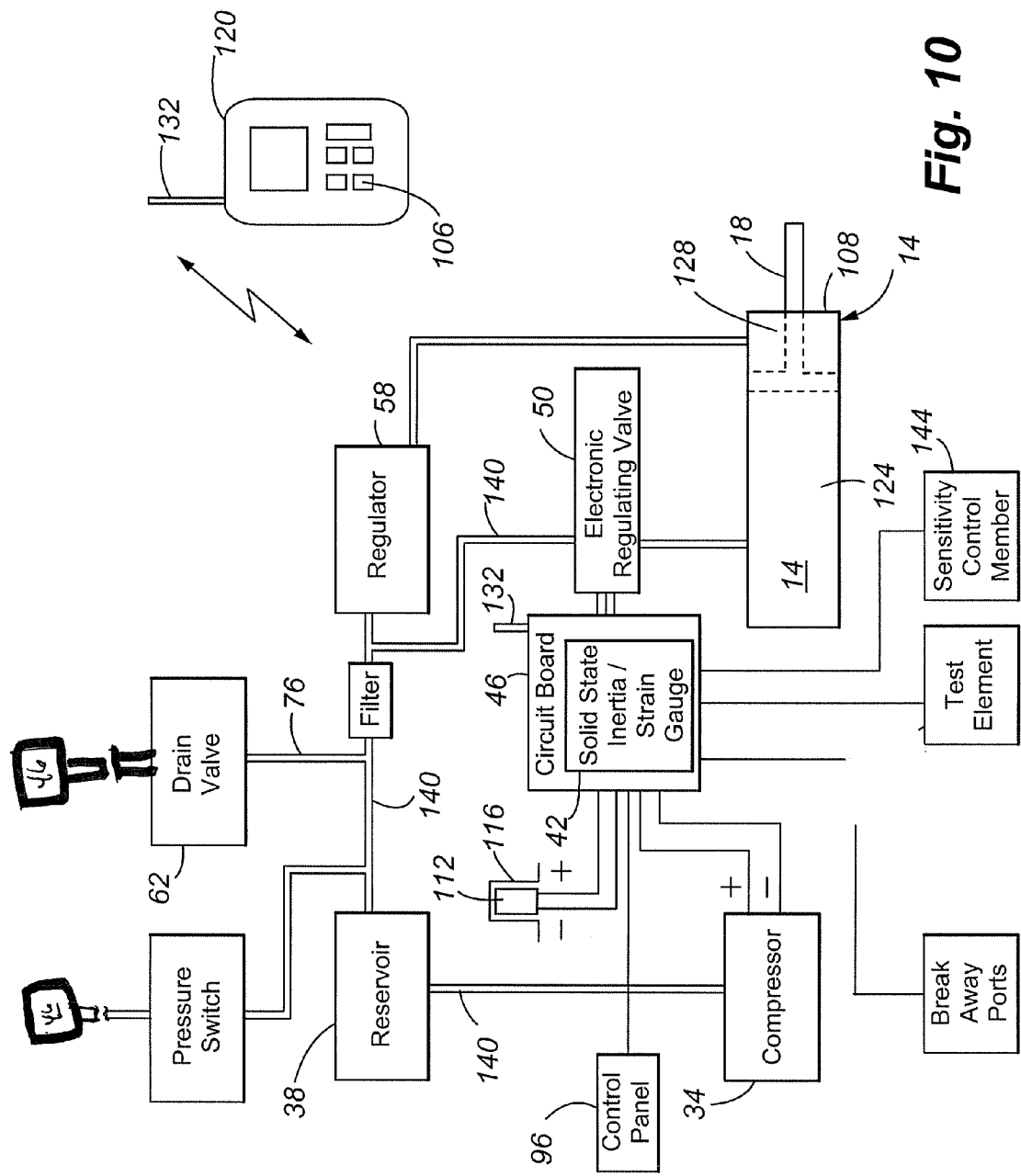
FIG. 10 is a schematic of the components of the auxiliary braking apparatus.

Referring now to FIGS. 9 and 10, in order to depress the brake pedal 22 of the towed vehicle 26, embodiments of the auxiliary braking apparatus 2 are reliant upon the transmittal of pressurized fluid. As one ordinarily skilled in the art can appreciate, the fluid can take many forms, such as air, gas, and hydraulic fluid, and still be within the spirit and scope of the present invention. In one embodiment, the pressurized fluid is released into the cylinder 14 in order to depress the brake pedal 22 of the towed vehicle 26. The cylinder 14 is further comprised of the actuator arm 18 in slidable communication with a casing 108. While the casing 108 generally has a substantially circular cross-sectional shape, the casing 108 can also be made in a variety of other cross-sectional shapes, such as octagonal, square, rectangular, triangular, etc., and still be within the scope of the present invention. In one embodiment, the actuator arm 18 is preferably manufactured in a conventional piston/rod configuration and functions in a first position of rest in which the actuator arm 18 remains in a retracted position within the casing 108 and a second position of use in which the actuator arm 18 is extended away from the casing 108 in order to depress the brake pedal 22 of the towed vehicle 26. The cylinder 14 is not limited by the transmittal of any particular type of pressurized fluid. Rather, the actuator arm 18 can be hydraulically, pneumatically, mechanically, magnetically, or electrically driven and still be within the scope of the present invention. Similarly, the cylinder/actuator arm assembly could be replaced with a screw drive assembly which could drastically reduce and/or eliminate fluid leakage, and associated clutter and system performance degradation issues. Due to the portable nature of auxiliary braking systems 2, in one embodiment, the auxiliary braking apparatus 2 is provided power via a corded plug 112. However, as one ordinarily skilled in the art can appreciate, alternative ways of providing an electrical power to the auxiliary braking apparatus 2 can be used. For example, a conventional, rechargeable or non-rechargeable battery may be interconnected to the apparatus 2. Similarly, a fuel or solar cell may be employed as the internal or external power source.

In one embodiment, logic on at least one circuit board 46 housed within the apparatus 2 communicates with the valve 50 to vary the pressure depending on several factors, such as, among other things, whether the unit is in an "on-off" or "proportional" mode. When the brake pedal 22 needs to be released, logic on the at least one circuit board 46 communicates with the regulator 58 that is interposed between the reservoir 38 and the extend side 124 of the actuator arm 18, thereby lowering the pressure and allowing the actuator arm 18 to retract away from the brake pedal 22. In one embodiment, a regulator 58 is interposed between the reservoir 38 and the retract side 128 of the actuator arm 18, whereby the regulator 58 maintains a constant pressure (e.g., 10 PSI) on the retract side 128, which can be monitored and used to detect failures within the system. As one ordinarily skilled in the art can appreciate, various means of driving and retracting the actuator arm 18 can be used.

One advantage of locating the logic with the apparatus 2 is that if the remote control malfunctions, the operator is still able to, for example, alter the braking sensitivity, by accessing controls on the apparatus. Other advantages will be apparent to one skilled in the art, such as rapid functional operation of the apparatus 2 in circumstances where the wires or RF communication from the remote are damaged, severed, delayed or impaired, or when the towed vehicle has broken away from the towing vehicle. For example, if the logic is located in the remote, the function of the braking apparatus can be impaired in a number of ways such as remote failure, failure of the link between the remote and braking unit, or separation of the towed and towing vehicles. In the case of separation of the towed and towing vehicle, the remote would not be likely to sense the separation. Even if the remote did sense such a separation, the remote would probably not have time to signal the auxiliary braking apparatus to apply the towed vehicles brakes. Remote failure increases the chances of total system failure because the logic must be used and then transmitted to the auxiliary braking unit. This means that the remote must perform twice as many functions which increases complexity and thus the likelihood of failure.

In addition, temporary loss of RF signal is common, so the link between the remote and the auxiliary braking apparatus could from time to time be lost. Just as common is RF interference from other sources that overloads or interferes with intended communications. Thus, it is advantageous to incorporate the braking logic in the towing vehicle to compensate for any lapses in communication. Conversely, if the link is hard wired, the connection between the vehicles can separate, the wire can break or wear thru, or the connectors can corrode. Hard wired connections are also subject to EMC interference, i.e., radiation that is absorbed in the wires/circuits and transmitted as noise into the logic circuit. While these conditions can occur wherever the logic is located, having the logic in the place where critical functions occur minimizes the probability of a problem.

As noted above, one embodiment of the present invention employs a novel method of monitoring the position of the actuator arm 18. More specifically, often it is desirable to ensure that the actuator arm 18 of the cylinder 14 is in its correct position, i.e., wherein it is not depressing the brake pedal 22 when not in use, or conversely, depressing the brake pedal 22 to the predetermined amount when activated. Some apparatus 2 employ spring returns and allow for the monitoring of a magnetic reed switch to accomplish this task. One embodiment of the present invention, however, employs a method of sensing the pressure on the extend side 124 of the cylinder 14 and comparing this value against a predetermined pressure. For example, in one embodiment, if anything other than a zero pressure is detected on the extend side 124 of the actuator arm 18 when it is supposed to be fully retracted, then a signal is transmitted by the circuit board 46 via a transmitter (or transceiver) 132 to the remote control/display device 120 positioned in the towing vehicle and/or a control panel/display 96 on the housing of the apparatus 2. In order to provide further information as to the exact location of the actuator arm 18, in one embodiment, pressure readings are taken on both the extend side 124 and the retract side 128 of the actuator arm 18, interpreted by the circuit board 46 and communicated to the apparatus 2 and/or the remote control/display device 132. As one skilled in the art can appreciate, other manners of monitoring the actuator arm 18 such as using gauges in communication with the actuator mechanism are also envisioned to be within the spirit and scope of the present invention.

In order to better accommodate a variety of operator's braking styles, the auxiliary braking apparatus 2 further includes a sensitivity control member 144. Unlike conventional auxiliary braking apparatus 2 that uses pendulums as activation switches, the present invention offers a broader range of sensitivity settings. As noted above, pendulum-oriented apparatus are limited by the length of the pendulum arm as to the extent of sensitivity settings. The present invention, however, is not limited in a similar manner and hence, offers lower sensitivity settings. In one embodiment, the sensitivity control member varies the voltage threshold used to activate the actuator arm 18. Further, in one embodiment, the sensitivity control member 144 is a button switch that communicates with circuit board 46, but can also be any type of switch known within the art. A display may also be interconnected to the housing 6 and positioned in electrical communication with the sensitivity control member 144 so that the operator can visually confirm adjustments made to sensitivity settings of the auxiliary braking apparatus 2. In one embodiment, the display is a plurality of LEDs. By depressing the sensitivity control member 144, the voltage threshold can be raised or lowered, as depicted by the number of LEDs that are illuminated.

As explained above, there is also the need to ensure that any residual pressurized fluid is removed from the auxiliary braking apparatus 2 prior to use in order to prevent accidental discharge. While manual valves in communication with the fluid reservoir 38 may used, in one embodiment, an automatic pressure release valve 50 is interconnected to the reservoir 38. The automatic pressure release valve 50 will activate when the auxiliary braking apparatus 2 is deactivated, thereby ensuring that substantially no air remains in the reservoir 38. This embodiment of the present invention has the advantage of compensating for the memory lapses of the operator of the towing vehicle.

Depending on the size of the towed vehicle 26 and type of fluid used, various sizes and types of piping 140 can be used to transmit the pressurized fluid. Preferably, the pipes 140 are of sufficient thickness to accommodate a variety of pressures, thereby allowing the apparatus 2 to be used with a host of vehicles.

In addition, various triggering mechanisms have been used to activate various auxiliary braking systems 2 based on inertial changes sensed in response to the towing vehicle's braking Pendulums and/or solid-state inertia devices are examples of conventional accelerometers that may be used. In one embodiment, the solid-state inertia device is a semi-conductor chip coupled with a strain gauge, both of which are in electrical communication with the previously identified, at least one circuit board 46 of the auxiliary braking apparatus 2. As the towed vehicle 26 is braked, the strain gauge of the solid-state inertia device senses the change in deceleration experienced by the towed vehicle. A corresponding change in voltage is transmitted to the circuit board 46 and stored in a capacitor or other similar storage device known in the art. In one embodiment, during a pre-selected interval, the voltage is compared to a threshold chosen (i.e., a voltage curve) by the operator and/or preprogrammed by the manufacturer. If the voltage exceeds the threshold, an electrical signal is sent to the regulator 58, which, in turn, increases the fluid pressure on the extend side 124 of the actuator arm 18, extends the actuator arm 18 and causes the towed vehicle 26 to brake. In one embodiment, a conventional amplifier can be interposed between the capacitor and the regulator 58 in order to amplify the electrical signal. In one embodiment, if the voltage does not exceed the threshold, but is rather attributable to a change in gravitational direction, for example, when the towed vehicle is ascending a hill, the circuit board 46 restores the voltage stored in the capacitor or similarly configured storage device to a pre-determined level. Thus, gravitational effects are substantially eliminated from the auxiliary braking device 2.

In another embodiment, a conventional accelerometer in the auxiliary braking system 2 transmits a voltage reading to the unit's circuit board 46 for processing. The accelerometer voltage reading can be attributable to numerous occurrences, such as, among other things, acceleration, deceleration, and changes in directional orientation. In one embodiment, the received signal is further processed as required by a logic processor of the circuit board 46 prior to further interpreting the voltage reading. For example, there may be hardware-specific issues that must addressed in order for the signal to be effectively processed. Moreover, in one embodiment, it may not be desirable to have the towed vehicle's 26 brakes applied equally in response to any or all of the previously described occurrences. In one embodiment, comparisons are then made to pre-existing values, thereby noting any change in voltage transmitted by the signal. As one ordinarily skilled in the art can appreciate, this operation can be performed in a myriad of manners, all of which fall within the spirit and scope of the present invention. In one embodiment, software in a logic processor of the circuit board 46 performs this operation by registering the immediate value of the voltage of the incoming signal and compares it to a previously received signal, thereby noting any increase or decrease. Alternatively, in one embodiment, the signal is averaged over a pre-determined period of time. As can be appreciated, other calculations and comparative logic operations can be used alone, or in combination, to facilitate various operational, failure analysis and diagnostic functions. For example, in one embodiment, current trends experienced by the accelerometer could be compared against longer-term value trends. The result of this comparison could be then compared against predetermined threshold curve(s) that are pre-programmed by the manufacturer and/or selected by the operator. In one embodiment, such compiled information could be used to generate a signal that results in the towed vehicle's brakes being applied. For example, in one embodiment, the generated signal causes the electronic regulating valve to adjust the fluid pressure on the extend side of the actuator arm, thereby moving the arm and applying the desired braking in the towed vehicle.

In order to most effectively cause braking to occur in the towed vehicle, in one embodiment, logic in the circuit board directs an increased pressure to be applied for a specified period of time to the actuator arm. This allows the brake pedal to advance quickly through the non-braking period inherent to most brake pedals. Once accomplished, the logic directs a lesser pressure to be applied to the actuator arm in order to perform the desired amount of braking As one ordinarily skilled in the art can appreciate, any conventional circuit board can be used to control the flow of the pressurized fluid and hence, the extension/retraction of the piston arm. Similarly, additional hardware, firmware, and/or software can be used alone, or in combination, with the circuit board. In one embodiment, a transceiver is integrated into or positioned in electrical communication with the circuit board in order to facilitate the transmission and receipt of information to and from a remote control.

In one embodiment of the present invention, the circuit board 46 is mounted to an underside of a control module, which contains, among other things, a display for the operator to manually use. As noted throughout, a variety of visual and/or audio devices could be used to display the pertinent data to the operator. In one embodiment, the control module is removably mounted within the housing of the apparatus so that if a particular component of the circuit board 46 fails, the control module can be removed and the component easily accessed. In one embodiment, an entirely new control module can be replaced or the particular component can be individually serviced and/or replaced. In one embodiment, the circuit board 46 is interconnected to auxiliary brake apparatus' electrical system through the use of one or more quick connect harnesses, which facilitates removal and replacement, if necessary, of the control module.

When an operator desires to change from an "on-off" mode to a proportional braking mode, in one embodiment of the present invention, an operator either actuates a device on the housing of the auxiliary braking apparatus 2 or sends an RF signal from the remote control unit 120 in the towing vehicle. Once received by the apparatus 2, software coupled with existing hardware components cause pressurized fluid to be released to the actuator arm 18, and hence to the brake pedal 22 of the towed vehicle 26 in a manner that is proportional to the amount of deceleration applied to the towing vehicle.

One embodiment of the present invention provides a method of monitoring the time the compressor 34 is operating. More specifically, leakage in the system can cause the compressor 34 to continually be in operation in order to replenish the reservoir 38. While some leakage may be acceptable in the system, gross leakage may lead to the compressor 34 overheating or failure, thereby rending the auxiliary braking apparatus 2 non-functional. As one ordinarily skilled in the art can appreciate, such monitoring can be achieved in a myriad of manners, all of which are considered to be within the spirit and scope of the present invention. For example, embodiments of the present invention employ logic on one or more circuit boards 46 monitors and compares the compressor's 34 run time against a preset time in order to determine possible leaks and/or premature failure of the compressor 34. In another embodiment, the number of on/off compressor cycles and the number of times the auxiliary braking apparatus 2 has applied the brakes are monitored during a predetermined period of time and compared against a preset value. It is envisioned that there could be multiple ways used to monitor these readings. For example, to determine when the brakes have been applied, the system could track the number of times that the towed vehicle's brake lights were activated. Similarly, the number of times the actuator arm 18 was extended could be tracked and reported. Such tracking of the extension of the actuator arm 18 could also occur in a myriad number of ways, including, but not limited to, using one or more mechanical switches, pressure monitoring, valve activations, etc. In one embodiment, regardless of how collected, monitored and analyzed, the interpreted information is then transmitted to an indicator on the control panel 96 of the apparatus 2 and/or on a remote control 120 located in the towing vehicle. As one skilled in the art can appreciate, the indicator can be comprised of any combination of visual LEDs, digital readout(s), etc. and/or analog and/or audio indicators and still be within the spirit and scope of the present invention.

While the present invention has been described for "on/off" applications, wherein the towed vehicle brake pedal is either depressed or remains in its normal, non-depressed position, it is also envisioned that the auxiliary braking apparatus 2 can be adapted to apply proportional braking force to the towed vehicle. In one embodiment, software is coupled with existing hardware components to release pressurized fluid to the actuator arm 18, and hence to the brake pedal 22 of the towed vehicle 26 in a manner that is proportional to the amount of braking force applied to the towing vehicle. Further, one embodiment of the present invention allows for selective adjustment of the braking mode from proportional to non-proportional. More specifically, the remote control 120 employed by embodiments of the present invention may include various displays and user interfaces. The remote control 120 transmits and receives data through an antenna that communicates with an antenna of the auxiliary braking apparatus 2. Thus, embodiments of the present invention allow selective alteration of the braking mode from the proportional to non-proportional and vice versa through the remote control 120. The advantage of this way of altering braking mode is that the operator of the towing vehicle does not have to pull over and stop the vehicle in order to make changes. Also, it is envisioned that embodiments of the present invention include the remote control 120 for communication with the auxiliary braking device 2 thereby allowing customization of the sensitivity of the proportional braking apparatus and/or customization of the algorithms that control the proportional braking system.

When an operator desires to change from an on-off mode to a proportional braking mode, in one embodiment of the present invention, an operator either actuates a device on the housing of the auxiliary braking unit or sends an RF signal from a remote control unit in the towing vehicle. Once received by the unit, software coupled with existing hardware components cause pressurized fluid to be released to the actuator arm 18, and hence to the brake pedal 22 of the towed vehicle 26 in a manner that is proportional to the amount of deceleration applied to the towing vehicle.

It is not uncommon for auxiliary brake systems 2 to allow the operator to test the apparatus 2 by depressing the brake pedal 22 with the actuator arm 18 one or more times in order to determine proper placement of the apparatus 2 in the towed vehicle 26. Further, prior to using the auxiliary braking apparatus 2, it is imperative to bleed the brake vacuum cylinder of the towed vehicle 26 in order to avoid unexpected, excessive braking One way to ensure that the operator bleeds the brakes is provided by one embodiment of the present invention that includes a brake bleed indicator 118 that notifies the operator that the brakes of the towed vehicle 26 must be bled, perhaps because the other vehicle has had to be turned on for a pre-determined amount of time to recharge its battery, thereby recharging the vacuum cylinder in the towed vehicle. In order to relieve this vacuum, the brake pedal 22 must be depressed a predetermined amount of times. In one embodiment, when the voltage sensed by the auxiliary braking apparatus 2 rises above or reaches a certain level (e.g., 13.8 volts) due to the 12 volt battery being charged by the towed vehicle's alternator, a signal is sent to the remote control 120 to notify the driver that the brakes need to be bled prior to departure because the towed vehicle's 26 brake vacuum reservoir has been recharged. In one embodiment, this information is displayed via the brake bleed indicator 118, which can be employed through a variety of visual and/or audio devices. Once this information has been received, in one embodiment, a single button is depressed by the operator, either on the auxiliary braking apparatus 2 or on the remote 120, which would cycle the actuator arm 18 a predetermined amount of times to dissipate the air in the towed vehicle's 26 vacuum cylinder. It should be understood that the automatic cycling can be accomplished using pre-selected and/or varied pressures, speed and/or timing. The automatic cycling effect also allows the operator to perform a safety check that normally requires two people. While cycling of the brake pedal 22, the operator may go to the back of the vehicle to check as to whether the towed vehicle's 126 brake lights are working and/or verify whether the unit has been properly installed.

Figure 11:
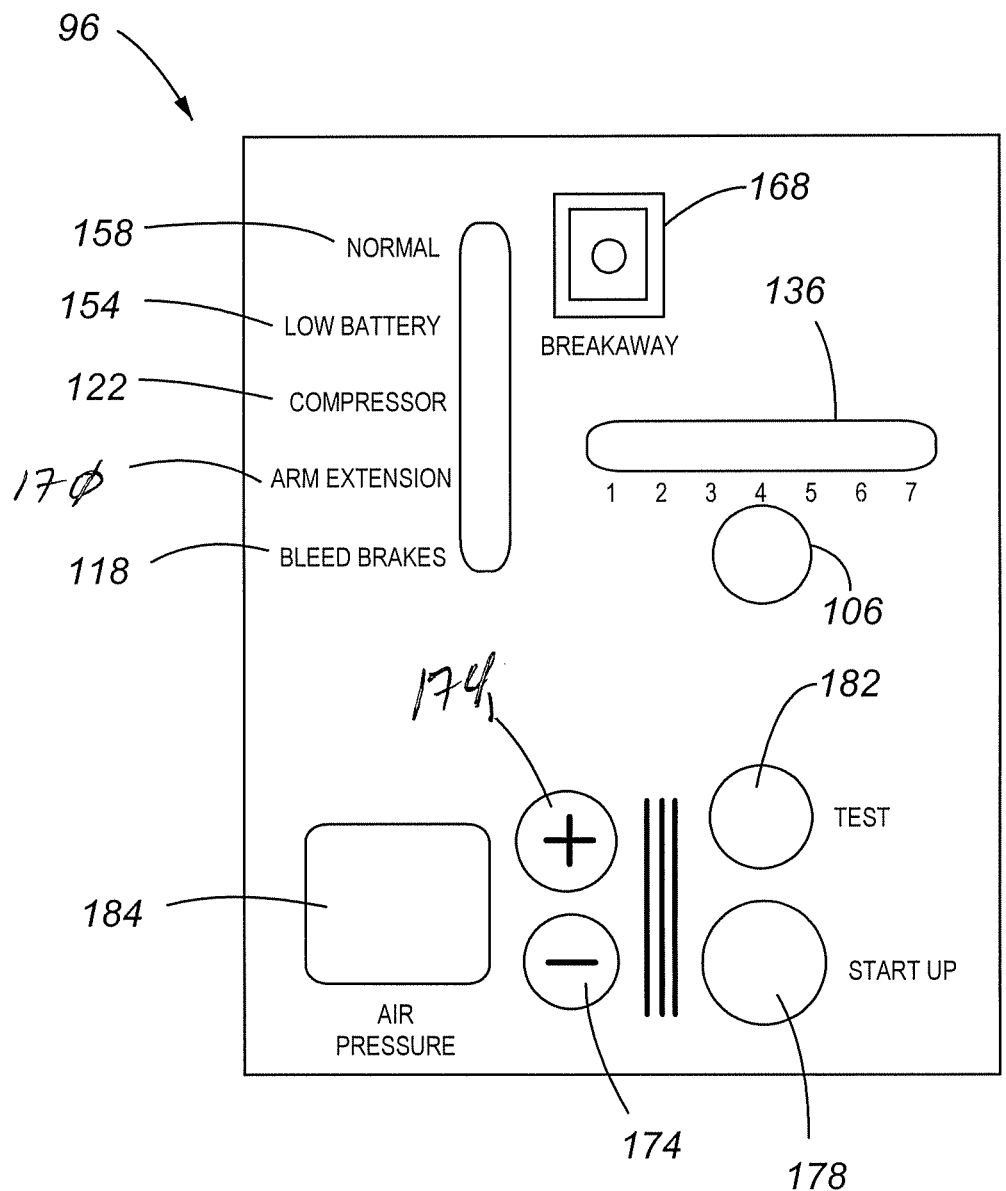
FIG. 11 is a depiction of a control panel/display screen of one embodiment of the invention.
Figure 12:
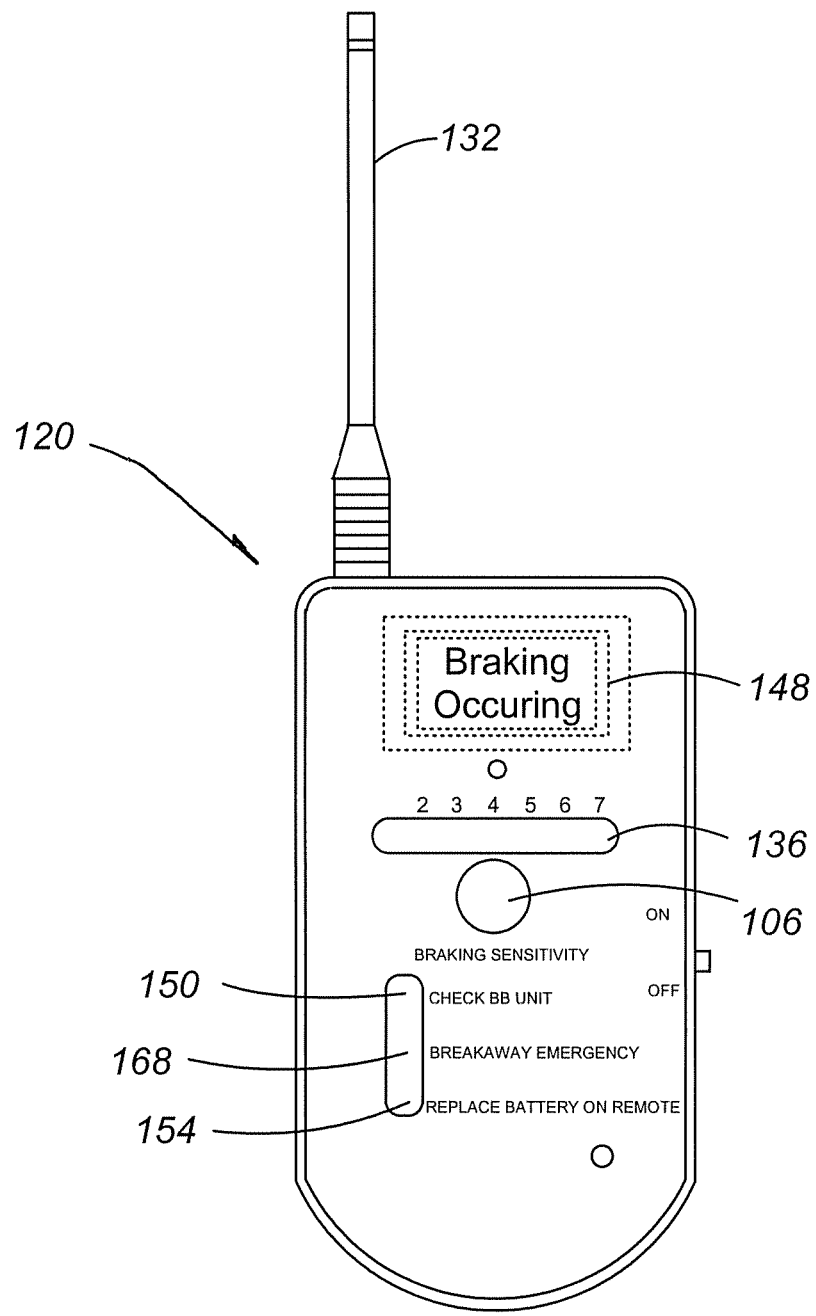
FIG. 12 is a front elevation view of a remote control.

With reference now to FIGS. 11 and 12, as briefly described above, one skilled in the art will appreciate that the remote control 132 may have a plurality of buttons, i.e., a user interface, that allows the operator to, among other things, alter the brake pressure applied as well as the sensitivity by, for example, altering algorithms and/or logic curves associated with certain braking characteristics and braking mode of the apparatus. Further, in one embodiment, a display on the remote 120 or the control panel 96 may report the amount of braking pressure being asserted in the towed vehicle 26 (e.g., in the form of bars, digital readout, LEDs, etc.). More specifically, one embodiment of the remote 132 and/or the control panel 96 includes a visual sensitivity display 136 ranging from 1 to 7 for example. When the operator depresses a braking sensitivity button 106 the amount of brake sensitivity will be displayed by at least one of the indicators 136. For example, the more lights that are illuminated, the easier the auxiliary braking apparatus 2 will activate. In one embodiment, each time the apparatus 2 is installed, the sensitivity setting remains in the last setting.

Furthermore, other visual or audio indicators may be included on the remote control 120 such as a light 148 to indicate when braking of the apparatus 2 is occurring, or an inspection indicator 150, a break-away emergency indicator 168 and a low battery indicator 154. Preferably, in one embodiment, the remote control device 120 can also receive diagnostic-related information about the operation of the auxiliary brake apparatus 2. In one embodiment, the remote control device 120 is equipped with an RF transceiver 132 to facilitate such communications. As noted above, in order to eliminate any interference with the towing vehicle's electrical system and to minimize the problems commonly associated with corded devices, in one embodiment, the remote control 120 is battery powered and further comprises a securing member such as a suction cup, hook and loop fasteners, etc. for securing the remote control 120 within the towing vehicle so that it remains in the operator's line of sight. Further, in one embodiment, as one skilled in the art can appreciate, the remote control device 120 can be equipped with one or more video and/or audio devices to communicate received information and transmit command to the auxiliary brake apparatus 2.

It should also be well understood by those skilled in the art a similar control panel 96 may be associated with the auxiliary braking apparatus 2. This control panel 96 may include a number of visual or audio displays including an indicator that all is running normally 158, a low battery indicator 154, a compressor run time indicator 122, an arm extension indicator 170 and an indicator 118 that the brakes need to be bled. These indicators are associated with the aspects of the invention described above related to compressor run time and arm location, for example. In addition, an indicator 168 to indicate whether the breakaway system has been engaged may also be included. This breakaway system indicator 168 may be used in conjunction with breakaway device requirements, which will be described below, and will indicate to the operator that the breakaway system is absent. In addition, the breakaway indicator 168 may be used to show that the towed vehicle has indeed broken away from the towing vehicle. Further, as on the remote control 120, a sensitivity indicator 136 may be used in conjunction with a user interface 106. Depression of the user interface 106 will allow an operator to change the amount of brake sensitivity. Furthermore, an air pressure display 184 may also be included and associated with air pressure adjustment buttons 174 to selectively increase and decrease the air pressure in the reservoir. It is also contemplated that embodiments of the present invention include a start up button 178, that when depressed, activates the apparatus and selectively depresses the brake pedal a prerequisite amount of times to exhaust the brake vacuum in the towed vehicle. Finally, a test button 182 may be included to provide the user the ability to quickly assess if all is in working order. The foregoing is a description of buttons and displays of one embodiment of the present invention. One skilled in the art will appreciate that a myriad of buttons, and displays, either visual or audio, may be provided to monitor any number of aspects of the present invention.

Figure 13:
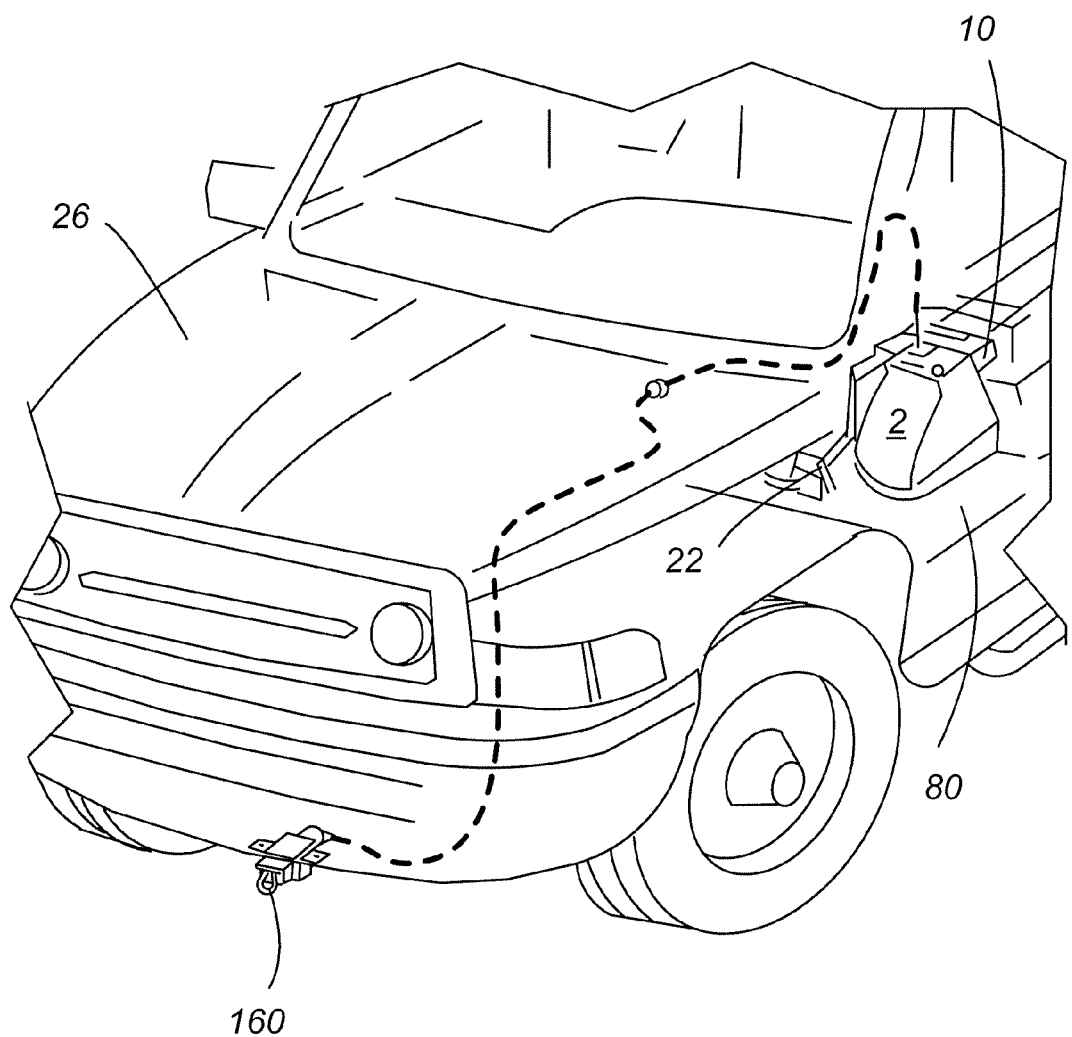
FIG. 13 is a perspective view of one embodiment of the present invention positioned in a vehicle.
Figure 14:
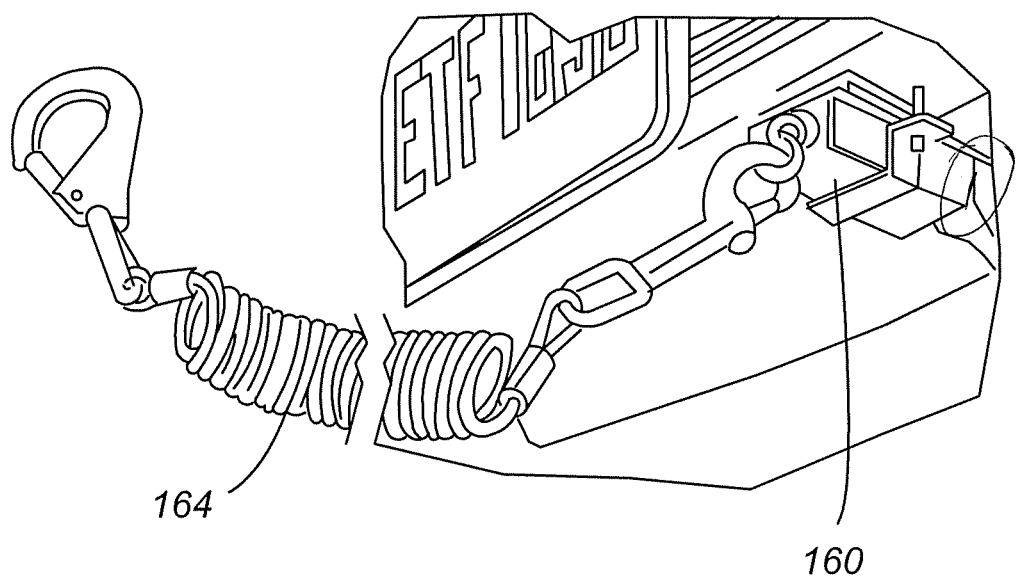
FIG. 14 is a detailed view of FIG. 13.

Referring now to FIGS. 13 and 14, in order to promote safer use of auxiliary brake systems 2, in one embodiment and as noted above, the present invention detects whether a breakaway mechanism 160 is interconnected via a lanyard 164 for example, to the auxiliary braking apparatus. Typically auxiliary braking systems employ a normally "open circuit" design in which a port-terminal configuration (see e.g., U.S. Pat. No. 6,126,246 to Decker, Sr. et al.) is used to alert the operator to accidental separation between the towed and towing vehicle. Upon separation, an electrical circuit is completed, which the circuit board recognizes, thereby causing the brake pedal of the towed vehicle 26 to be depressed and eventually halting the vehicle. In one embodiment of the present invention, the system recognizes that a breakaway mechanism 160 is interconnected to the apparatus by using a closed circuit design. In this configuration, if the breakaway mechanism 160 is not present or has failed, then a signal is sent to a display 168 on the housing of the apparatus 2 and/or a remote control 120 in the towing vehicle. Various other conventional manners of accomplishing this task are known in the art, all of which are envisioned to be within the spirit and scope of the present invention.

While various embodiment of the present invention have been described in detail, it is apparent that modifications and alterations of those embodiments will occur to those skilled in the art. However, it is to be expressly understood that such modifications and alterations are within the scope and spirit of the present invention, as set forth in the following claims.

While an effort has been made to describe some alternatives to the preferred embodiment(s), other alternatives will regularly come to mind to those skilled in the art. Therefore, it should be understood that the invention may be embodied in other specific forms without the parting from the spirit or central characteristic thereof. The present examples and embodiments, therefore, are to be considered in all aspects as illustrative and not restrictive, and the invention is not intended to be limited to the details given herein.

Further, the accompanying figures/drawings, which are incorporated in and constitute part of this disclosure, illustrate embodiments of the invention, and together with the description of the invention given above, serve to further explain the principles of the present invention. However, the embodiments contained therein are not meant to limit the scope of the present invention in any manner. Further, it should be understood that the drawings are not necessarily to scale. In certain instances, details that are not necessary for an understanding of the invention or that render other details difficult to perceive may have been omitted.

What is claimed:

1. An auxiliary braking system, comprising:
    a circuit;
    an actuator operably interconnected and controlled by the circuit;
    a mechanism interconnected to the actuator and adapted for interconnection to a brake pedal of a towed vehicle;
    an activator when used only once causes the actuator to move more than once to deplete the vacuum reservoir of a braking system of the towed vehicle; and
    an electrically operated bleed valve that automatically opens to at least partially deplete a fluid reservoir when the auxiliary braking system is turned off.

2. The auxiliary braking apparatus of claim 1, wherein the actuator is a piston operably associated with the fluid reservoir.

3. The auxiliary braking system of claim 1, further comprising an emergency braking switch that activates the actuator when the towing vehicle is spaced a predetermined distance from the towed vehicle, the auxiliary braking apparatus being inoperable if the emergency braking switch is not operatively associated with the auxiliary braking apparatus.

4. The auxiliary braking system of claim 1, wherein the remote device includes at least one of a braking indicator, a brake sensitivity indicator, an indicator related to the status of the auxiliary braking apparatus, an indicator related to the position of the towed vehicle in relation to the towing vehicle, and an indicator related to the power level of the remote device.

5. The auxiliary braking system of claim 1, wherein the auxiliary braking apparatus includes at least one of a normal operation indicator, low battery indicator, a compressor runtime indicator, an indication of an extension of the actuator, a reminder to bleed the brakes of the towed vehicle, an air pressure display, and a braking sensitivity indication.

6. The system of claim 1, wherein depleting the vacuum reservoir of a braking system of the towed vehicle is automatic.

7. The system of claim 1, wherein the activator is a start button wherein depressing the start button directs the actuator to selectively depresses the brake pedal of the towed vehicle a prerequisite amount of times to exhaust the brake vacuum in the towed vehicle.

8. The auxiliary braking system of claim 1, wherein said auxiliary braking system does not operate unless the vacuum reservoir of the braking system is depleted.

9. The auxiliary braking system of claim 1, wherein said auxiliary braking system does not operate unless the activator has been used.

10. A system for braking a towed vehicle comprising:
    an actuating means adapted for interconnection to a brake pedal of the towed vehicle;
    a control means in the towed vehicle operably interconnected to the actuating means;
    a manual system preparation interface in communication with the control means, the manual system preparation interface being activated once to direct the control means to selectively move the actuating means more than once; and
    a device that automatically reduces the pneumatic pressure of the system.

11. The system of claim 10, wherein the actuating means has an extension side and a retraction side that are in communication with one or more sensors.

12. The system of claim 10, wherein the actuating means further comprises a compressor in fluidic communication with a reservoir.

13. The system of claim 10, further comprising a means for releasing pressure in communication with the reservoir that is activated by at least one of automatically and manually.

14. The system of claim 10, wherein the communicating means sends a signal to the control means for selectively positioning between proportional braking and non-proportional braking of the towed vehicle.

15. A system for braking a towed vehicle comprising:
    an actuating means adapted for interconnection to a brake pedal of the towed vehicle;
    a control means in the towed vehicle operably interconnected to the actuating means and for selectively operating the actuating means;
    an activator that moves the actuating means more than one times to deplete the vacuum reservoir of a braking system of the towed vehicle, and wherein said system for braking a towed vehicle does not operate unless the vacuum reservoir of the braking system is depleted; and
    a device that automatically reduces the pressure of the system.

16. The system of claim 15 wherein the activator actuates the actuating means a preselected number of times after a notification is sent that the vacuum reservoir of the towed vehicle's braking system has been recharged.

17. The system of claim 15 wherein the activator actuates the actuating means a preselected number of times when the vacuum reservoir of the towed vehicle's braking system has been recharged.

18. The system of claim 15 wherein the activator uses a preselected or varied input.

19. The system of claim 14, wherein the activator is a start button wherein depressing the start button directs the actuator means to selectively depresses the brake pedal of the towed vehicle a prerequisite amount of times to exhaust the brake vacuum in the towed vehicle.

20. The system of claim 14, wherein depleting the vacuum reservoir of a braking system of the towed vehicle is automatic.

21. An auxiliary braking system, comprising:
  a circuit;
  an actuator operably interconnected and controlled by the circuit;
  a mechanism interconnected to the actuator and adapted for interconnection to a brake pedal of a towed vehicle; and
  an electrically operated bleed valve that automatically opens to at least partially deplete a fluid reservoir when the auxiliary braking system is turned off.

22. The auxiliary braking apparatus of claim 21, wherein the actuator is a piston operably associated with the fluid reservoir.

23. The auxiliary braking system of claim 21, further comprising an emergency braking switch that activates the actuator when the towing vehicle is spaced a predetermined distance from the towed vehicle, the auxiliary braking apparatus being inoperable if the emergency braking switch is not operatively associated with the auxiliary braking apparatus.

24. The auxiliary braking system of claim 21, wherein the remote device includes at least one of a braking indicator, a brake sensitivity indicator, an indicator related to the status of the auxiliary braking apparatus, an indicator related to the position of the towed vehicle in relation to the towing vehicle, and an indicator related to the power level of the remote device.

25. The auxiliary braking system of claim 21, wherein the auxiliary braking apparatus includes at least one of a normal operation indicator, low battery indicator, a compressor runtime indicator, an indication of an extension of the actuator, a reminder to bleed the brakes of the towed vehicle, an air pressure display, and a braking sensitivity indication.

26. The system of claim 21, wherein depleting the vacuum reservoir of a braking system of the towed vehicle is automatic.

27. The auxiliary braking system of claim 21, wherein said auxiliary braking system does not operate unless the vacuum reservoir of the braking system is depleted.

* * * * *